(12) United States Patent
Kritt et al.

(10) Patent No.: US 8,856,100 B2
(45) Date of Patent: Oct. 7, 2014

(54) DISPLAYING BROWSE SEQUENCE WITH SEARCH RESULTS

(75) Inventors: Barry A Kritt, Raleigh, NC (US); Sarbajit K Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 13/563,228

(22) Filed: Jul. 31, 2012

(65) Prior Publication Data
US 2014/0040225 A1 Feb. 6, 2014

(51) Int. Cl.
*G06F 7/00* (2006.01)
*G06F 17/30* (2006.01)

(52) U.S. Cl.
USPC ........................................................ 707/706

(58) Field of Classification Search
None
See application file for complete search history.

(56) References Cited

U.S. PATENT DOCUMENTS

| | | | |
|---|---|---|---|
| 6,356,898 B2 * | 3/2002 | Cohen et al. | 1/1 |
| 8,321,382 B2 * | 11/2012 | Vandervort et al. | 707/687 |
| 2009/0150769 A1 * | 6/2009 | Konnola et al. | 715/251 |
| 2009/0150792 A1 | 6/2009 | Laakso et al. | |
| 2011/0246453 A1 | 10/2011 | Krishnan et al. | |
| 2012/0042279 A1 * | 2/2012 | Naderi | 715/786 |
| 2012/0254776 A1 * | 10/2012 | Corella et al. | 715/760 |
| 2013/0014019 A1 * | 1/2013 | Kim et al. | 715/738 |

* cited by examiner

*Primary Examiner* — Uyen Le
(74) *Attorney, Agent, or Firm* — VanLeeuwen & VanLeeuwen; Steven L. Bennett

(57) ABSTRACT

Systems and computer program products may display a browse sequence for a plurality of statically paginated web pages with search engine results. The system may include a processor and a memory. The system may additionally include a program comprising a plurality of instructions stored in memory that are executed by the processor to (1) identify, in the source code of one web page, one or more links to at least another web page; (2) identify, in the source code of the at least another web page, one or more links to the one web page; (3) determine a browse sequence for the one web page and the at least another web page based on the identified one or more links to the at least another web page and to the one web page; and (4) display the browse sequence along with search results on a search engine results page.

14 Claims, 8 Drawing Sheets

DISPLAYING BROWSE SEQUENCE WITH SEARCH RESULTS

BACKGROUND

The present inventions relate to computerized search technologies, and more specifically, to systems that display browse sequence of web pages, such as the browse sequence of statically paginated web pages, with the search results.

A computerized search system, such as an Internet search engine, receives queries from users, compares each query to an index, selects a list of results from the index, and returns the list to the user. A search system may be implemented in a client-server architecture. The server may host a web site that provides a form to accept queries and may also host the back-end systems that build the index, parse queries, select results, and generate result pages. The client may run software, such as a web browser, that provides a user interface to accept queries and display results via the search system web site. The result page, which may be generated by the server and displayed by the client, may be formatted for the user's convenience. For example, each item in a list of results may include text describing the indexed web page and a hyperlink to that page, so that the user can evaluate each result and visit each web page that matched the query.

BRIEF SUMMARY

According to one embodiment, a computer system may include a processor and a memory. The computer system may additionally include a program comprising a plurality of instructions stored in the memory that are executed by the processor to identify, in the source code of one web page, one or more links to at least another web page, and identify, in the source code of the at least another web page, one or more links to the one web page. The plurality of instructions additionally comprises instructions that are executed by the processor to determine a browse sequence for the one web page and the at least another web page based on the identified one or more links to the at least another web page and to the one web page. The plurality of instructions further comprises instructions that are executed by the processor to display the browse sequence along with search results on a search engine results page, the search results including information regarding one or more of the one web page and the at least another web page.

According to one embodiment, a computer program product for displaying a browse sequence for a plurality of statically paginated web pages on a search engine results page may include at least one computer readable storage medium having computer readable program instructions embodied therewith. The computer readable program instructions, when read by a processor, may be configured to identify, in the source code of one web page, one or more links to at least another web page, and identify, in the source code of the at least another web page, one or more links to the one web page. The computer readable program instructions, when read by a processor, may be additionally configured to determine a browse sequence for the one web page and the at least another web page based on the identified one or more links to the at least another web page and to the one web page. The computer readable program instructions, when read by a processor, may be additionally configured to display the browse sequence along with search results on a search engine results page, the search results including information regarding one or more of the one web page and the at least another web page.

Any of the above embodiments may be embodied as computer-based methods, systems, or program products.

DETAILED DESCRIPTION

Figure 1:
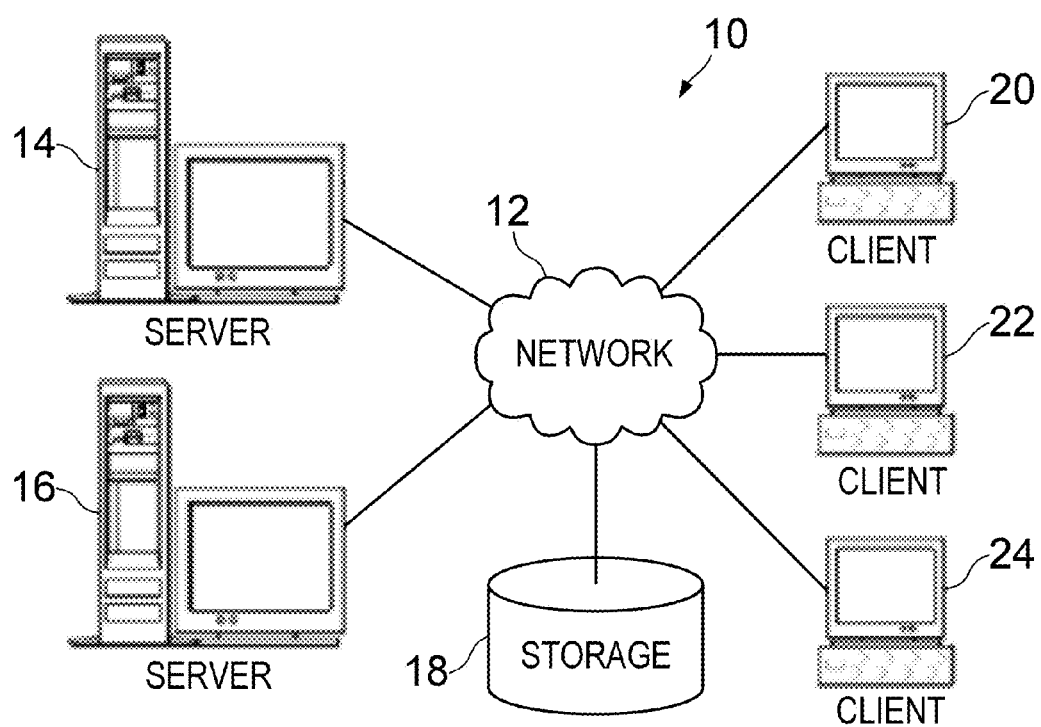
FIG. 1 is a pictorial representation of an example of a computer system in which illustrative embodiments may be implemented.

As will be appreciated by one skilled in the art, aspects of the present inventions may be embodied as a system, method, or computer program product. Accordingly, aspects of the present inventions may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present inventions may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventions may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventions are described below with reference to flowchart illustrations and/or block diagrams of methods, apparatus (systems) and computer program products according to embodiments of the inventions. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Figure 2:
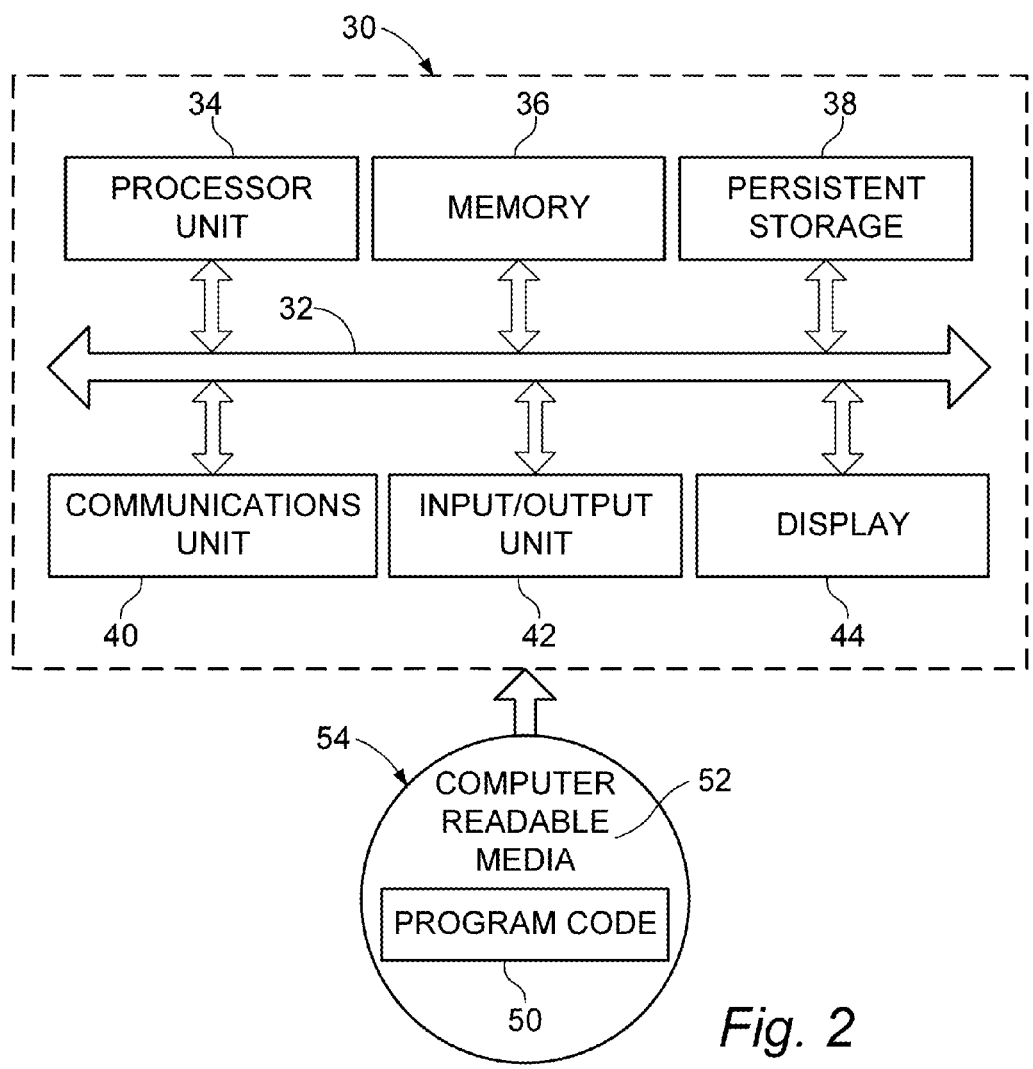
FIG. 2 is a block diagram of an example of a computer in which illustrative embodiments may be implemented.

With reference now to the figures and in particular to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

The flowcharts and block diagrams in the figures illustrate the architecture, functionality, and operation of possible implementations of systems, methods and computer program products according to various embodiments of the present inventions. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1 depicts a computer system, indicated generally at 10, and including a network of computers in which illustrative embodiments may be implemented. Computer system 10 may contain a network 12, which is the medium used to provide communications links between various devices and computers connected together within computer system 10. Network 12 may include connections, such as wire, wireless communication links, or fiber optic cables, or combinations of such connections.

In the depicted example, a server 14 and a server 16 may connect to network 12 along with a storage unit 18. In addition, one or more client computers may connect to network 12, such as a first client computer 20, a second client computer 22, and a third client computer 24. Client computers 20, 22, and 24 may be, for example, personal computers work stations, or network computers. In the depicted example, server 14 may provide data, such as boot files, operating system images, and/or software applications to client computers 20, 22, and 24. Client computers 20, 22, and 24 are clients to server 14 in this example. Computer system 10 may include additional servers, clients, and other devices not shown, or may include fewer devices than those shown.

In the depicted example, network 12 may be or may include the Internet. Computer system 10 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of an exemplary data processing system 30 is shown in which illustrative embodiments may be implemented. Data processing system 30 is an example of a computer, such as server 14 or client computer 20 in FIG. 1, in which computer-usable program code or instructions implementing the processes may be located for the illustrative embodiments. In this illustrative example, data processing system 30 may include communications fabric 32, which provides communications between a processor unit 34, a memory 36, a persistent storage 38, a communications unit 40, an input/output (I/O) unit 42, and a display 44. In other examples, a data processing system may include more or fewer devices.

Processor unit 34, also referred to simply as a processor, may serve to execute instructions for software that may be loaded into memory 36 from persistent storage 38. Processor unit 34 may be a set of one or more processors or may be a multi-processor core, depending on the particular implementation. Further, processor unit 34 may be implemented using one or more heterogeneous processor systems in which a main processor is present with secondary processors on a single chip. As another illustrative example, processor unit 34 may be a symmetric multi-processor system containing multiple processors of the same type.

Memory 36 and persistent storage 38 are examples of storage devices. A storage device is any piece of hardware that is capable of storing information either on a temporary basis and/or a permanent basis. Memory 36, in these examples, may be, for example, a random access memory or any other suitable volatile or non-volatile storage device. Persistent storage 38 may take various forms depending on the particular implementation. For example, persistent storage 38 may contain one or more components or devices. For example, persistent storage 38 may be a hard drive, a flash memory, a rewritable optical disk, a rewritable magnetic tape, or some combination of the above. The media used by persistent storage 38 also may be removable. For example, a removable hard drive may be used for persistent storage 38.

Communications unit 40, in these examples, provides for communications with other data processing systems or devices. For example, communications unit 40 may be a network interface card. Communications unit 40 may provide communications through the use of either or both physical and wireless communications links.

Input/output unit 42 allows for input and output of data with other devices that may be connected to data processing system 30. For example, input/output unit 42 may provide a connection for user input through a keyboard and mouse. Further, input/output unit 42 may send output to a printer. Display 44 displays information to a user.

Instructions for the operating system and applications or programs are located on persistent storage 38. These instructions may be loaded into memory 36 for execution by processor unit 34. The processes of the different embodiments may be performed by processor unit 34 using computer implemented instructions, which may be located in a memory, such as memory 36. These instructions are referred to as program code, computer-usable program code, or computer-readable program code that may be read and executed by a processor in processor unit 34. The program code in the different embodiments may be embodied on different physical or tangible computer-readable media, such as memory 36 or persistent storage 38.

Program code 50 may be located in a functional form on a computer-readable media 52 that is resident on a local or remote storage device or is selectively removable and may be loaded onto or transferred to data processing system 30 for execution by processor unit 34. Program code 50 and computer-readable media 52 form computer program product 54 in these examples. In one example, computer-readable media 52 may be in a tangible form, such as, for example, an optical or magnetic disc that is inserted or placed into a drive or other device that is part of persistent storage 38 for transfer onto a storage device, such as a hard drive that is part of persistent storage 38. In a tangible form, computer-readable media 52 also may take the form of a persistent storage, such as a hard drive, a thumb drive, or a flash memory that is connected to data processing system 30. The tangible form of computer-readable media 52 is also referred to as computer-recordable storage media. In some instances, computer-recordable media 52 may not be removable.

Alternatively, program code 50 may be transferred to data processing system 30 from computer-readable media 52 through a communications link to communications unit 40 and/or through a connection to input/output unit 42. The communications link and/or the connection may be physical or wireless, or a combination of physical and wireless in the illustrative examples. The computer-readable media also may take the form of non-tangible media, such as communications links or wireless transmissions containing the program code.

The different components illustrated for data processing system 30 are not meant to provide architectural limitations to the manner in which different embodiments may be implemented. The different illustrative embodiments may be implemented in a data processing system including components in addition to or in place of those illustrated for data processing system 30. Other components shown in FIG. 2 can be varied from the illustrative examples shown. As one example, a storage device in data processing system 30 is any hardware apparatus that may store data. Memory 36, persistent storage 38, and computer-readable media 52 are examples of storage devices in tangible forms.

In another example, a bus system may be used to implement communications fabric 32 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 36 or a cache such as found in an interface and memory controller hub that maybe present in communications fabric 32.

Figure 3:
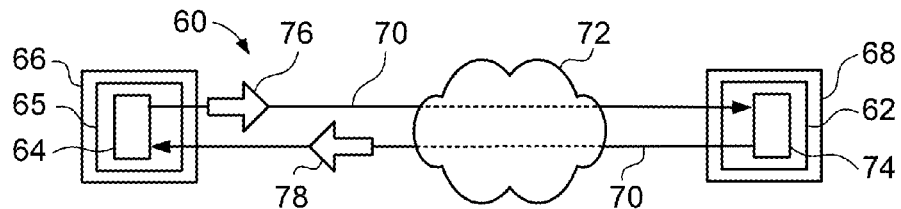
FIG. 3 is a block diagram of an example of a computerized search system in which illustrative embodiments may be implemented.

With reference also to FIG. 3, a computerized search system, indicated generally at 60, may be a hardware and/or software system that allows a user to find documents, facts, images, videos, and/or other items of interest via an indexed body of data. System 60 may comprise a search engine 62 that provides a user interface 64 and may further comprise one or more client devices 66, search servers 68, and/or communications networks 70 connecting clients 66 to servers 68, such as via Internet 72. Search system 60 may be an example of computer system 10; client device 66 may be an example of clients 20, 22, 24; server 68 may be an example of servers 14, 16; and communications network 70 may be an example of network 12. System 60 may include other, alternative, or additional elements and/or may omit one or more elements.

Search engine 62 may be a portion of system 60 that analyzes a specified or discovered body of data, prepares one or more indexes 74 of the data, receives queries 76 from users, matches each query 76 to one or more indexes 74 to identify relevant results, generates a search engine result page (SERP) 78 from the selected results, and/or transmits SERP 78 back to the requesting user. For example, an Internet search engine, such as Google, Bing, or Yahoo!, may use automated tools to find and index web pages and other documents published on the Internet, host a web page that provides a form to accept queries 76 from users, and return SERP 78 that contains a list of zero or more web pages and/or other documents or files that match the query.

Search server 68 may be a computer system that provides computation and/or communication resources for search engine 62. For example, server 68 may provide resources for gathering and indexing data, matching queries to an index, selecting results, etc. Server 68 may also provide HTML, database, script-execution, and/or other services appropriate for hosting a web site that receives queries and delivers SERPs. Search engine 62 may employ multiple servers 68 (e.g., to divide distinct tasks among distinct servers).

User interface 64 may be any hardware/software system suitable for submitting query 76 to search engine 62 and/or displaying SERP 78 returned by search engine 62. Some portions of interface 64 may run on server 68, and other portions may run on client 66. For example, interface 64 may take the form of a web page hosted by server 68 and transmitted to a web browser 65 on client 66. An illustrative SERP shown in FIG. 7 includes a form that offers a query field 100 to allow the user to enter query 76 and a submit button 102 to allow the user to transmit query 76 to search engine 62.

Client device 66 may be any hardware and/or software appropriate to support interface 64. Examples of client devices 66 include personal computers, laptop computers, personal digital assistants, tablet devices, touch-screen devices, touch-pad devices, smart phones, cellular telephones, dedicated search appliances, search features embedded in products, etc. Client 66 may be in communication with network 70, such as to exchange data with remote search engine 62.

Query 76 may be any data to be sought in, compared to, and/or matched against one or more indexes 74. For example, query 76 may be a text string submitted via interface 64 to search engine 62. A query may include one or more keywords, which indicate terms of interest to be matched to indexed documents. A syntax for queries may offer options to form key phrases, to express logical relationships such as AND, OR, and NOT, to limit by proximity, etc. Query 76 is not necessarily text data. For example, search engine 62 may allow submission of image, video, audio, and/or spoken data as query 76.

Communications network 70 may include any data transmission pathway between user interface 64 and search engine 62. Network 70 may be wired and/or wireless and may include Internet 72. For example, network 70 may include a local area network that connects client 66 to Internet 72 and thereby to search engine 62.

SERP 78 may be a message returned by search engine 62 to client 66 to indicate zero or more results that match submitted query 76. For example, SERP 78 may take the form of a web page generated by search engine 62, transmitted to client 66, and displayed by a web browser on client 66. SERP 78 may include a results list 104 (shown in FIG. 7), which may be a division or portion of SERP 78 used to display a series of result items, such as 106A-106B. Each result item 106 may indicate a particular match identified in index 74 and may contain data that describes the matched result. For example, index 74 may contain or refer data extracted and/or derived from web pages. For each indexed web page, index 74 may include data, such as a web page title, a URL, a descriptive snippet, etc. Result item 106 obtained from an index accordingly may display a formatted title, a hyperlink to the indicated page, snippet text, etc. SERP 78, by providing a formatted description of each item 106, may help the user access the relevance of each item 106 and may allow the user to view or visit the original document, if desired.

The client-server architecture shown in FIG. 3 is a representative implementation of search system 60. System 60 may be implemented in diverse contexts and structures. For example, search engine 62 and user interface 64 may be parts of a freestanding search feature built into a help system shipped with a product. For another example, a computer system may use a search engine to index the content of local storage and provide interface 64 to find stored items via a generated index. Search engine 62 and interface 64 may reside on the same computer and do not necessarily communicate with each other via an external network. "Search server" and "client device" do not necessarily imply a client-server architecture.

Figure 4:
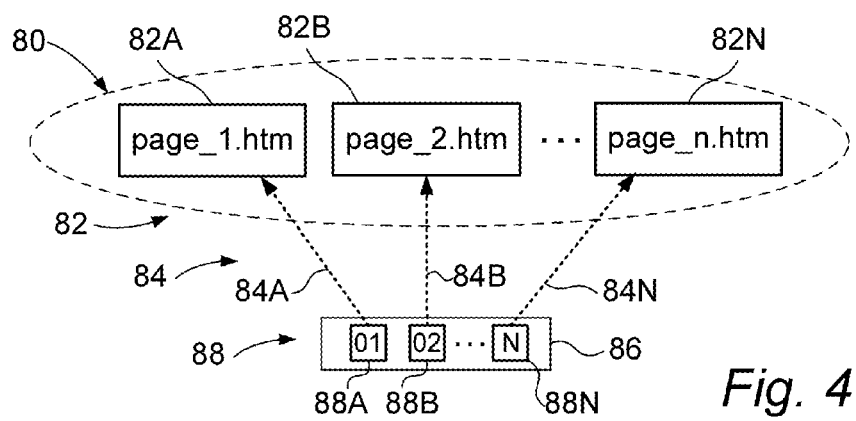
FIG. 4 is a block diagram of an example of a web site and a corresponding page navigator consisting of a set or series of page buttons in accordance with the principles of the present inventions.

Referring now also to FIG. 4, a web site 80 may include a set of one or more related web pages 82, such as web pages 82A-N, that are hosted on a web server and accessible over a network. Each web page 82 may be a document, implemented in a markup language (such as HTML) that may include or refer to content, such as text, graphics, scripts, etc. One or more web pages 82 may link to other web pages or to other files on web site 80 or elsewhere via one or more hyperlinks 84, such as hyperlinks 84A-N. Each hyperlink 84 may include an anchor (a visible word, phrase, or image that, when clicked, opens a new document or a new section of the current document) and a hypertext reference (a code that specifies the document or section to be opened, such as by its URL, and/or that specifies the behavior of a link when clicked, such as by executing a script). The appearance of anchors may differ according to context, such as by distinguishing the current page from other pages or by distinguishing visited pages from unvisited pages. The word "hyperlink" may sometimes be abbreviated to "link," and the word "webpage" or phrase "web page" may sometimes be abbreviated to "page." In FIG. 4 and elsewhere, the "A-N" notation may indicate any suitable range, where "A" refers to a first item and "N" refers to a second, third, or subsequent item.

Set of hyperlinks 84 sometimes may connect web pages 82 according to a systematic relationship between the linked pages. Those web pages may sometimes be referred to as having "static pagination" or being "statically paginated." An author of web site 80 may consider some or all its pages 82 as having a sequential relationship, similar to the sequential relationship among pages of a book. An author may start an article on a first web page, continue the article on a second web page, and conclude the article on a third web page, for example. These three pages, written to be read as a series, have a sequential relationship. A set of web pages that are linked or cross-referenced according to a systematic relationship, such as a series, may be referred to as having a "browse sequence." The browse sequence may include overt or implied page numbering and may span an entire web site, a portion of a web site, or portions of multiple web sites. For example, a web site may contain multiple articles, each divided into multiple pages, where each article has a distinct browse sequence.

The web pages may include one or more page-based navigation features that show the underlying relationships to the user and/or allow the user to navigate from page to page according to the relationships among pages. Page-based navigation may indicate organizational associations between pages by, for example, physical arrangement (e.g., a sequence of buttons) and/or by labels (e.g., page numbers expressed as text or graphic anchors). Examples of such navigational features include page buttons, first-page/last-page buttons, and previous-page/next page buttons, which may be used alone or in any combination.

Figure 6:
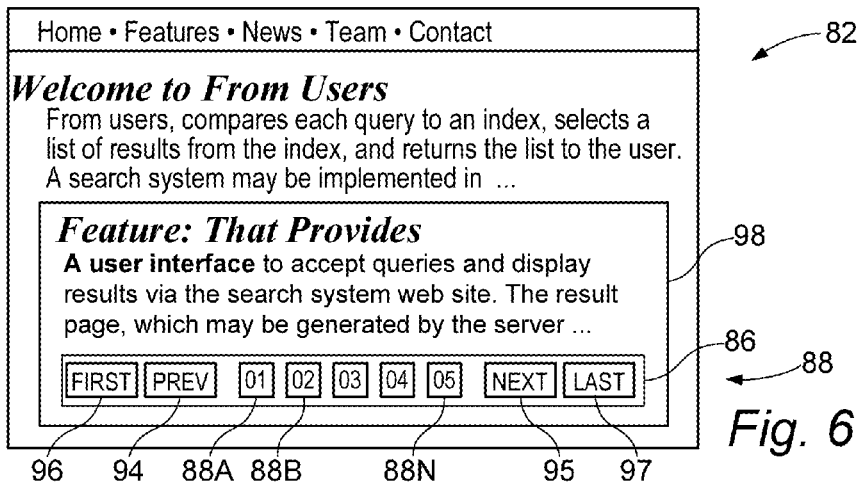
FIG. 6 is a block diagram of an example of a web page that includes a page navigator in accordance with the principles of the present inventions.

For example, FIG. 4 shows web site 80 comprising a set or series of web pages 82A-N. FIG. 4 also shows an example of a page-based navigation feature or page navigator 86 comprising a set or series of page buttons 88A-N. Each page button 88A-N links to corresponding web page 82A-N. Specifically, button 88A links to page 82A via hyperlink 84A; button 88B to page 82B via hyperlink 84B, etc. The sequence of buttons 88A-N within page navigator 86 and the text or graphic anchor of each button may reflect the organizational relationships (such as the browse sequence) of pages 82A-N. In FIG. 4, for example, the anchor of button 88A is "01," implying that linked page 82A is the first page in the series; the anchor of button 88B is "02," implying that page 82B is the second page of the series; etc. Each page of the series of pages 82A-N may include a copy or a variation of page navigator 86. FIG. 6, for example, shows representative page navigator 86 in context on web page 82. In FIG. 6, page navigator 86 provides set of page buttons 88 that allow the user to navigate to other pages of an article 98 started on web page 82. Page navigator 86 may include a box drawn around page buttons 88 to show their association that represents a browse sequence for pages 82A-N. The box is only a representative graphic design technique for indicating association or grouping.

Figure 5:
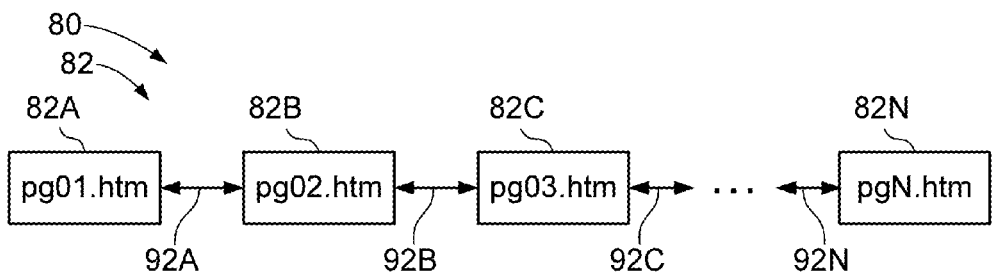
FIG. 5 is a block diagram of an example of a previous-next browse sequence in accordance with the principles of the present inventions.

Referring now also to FIG. 5, statically paginated web pages may be structured such that each web page links to its logical neighbors to form an ordered series. For example, web site 80 comprising a series of web pages 82A-N that are arranged via a series of browse links 92A-N. Page 82A, the first page, links to page 82B, the second page, which links back to page 82A, as shown by browse link 92A. Page 82B in turn links to page 82C, the third page, which links back to page 82B, as shown by browse link 92B. This pattern repeats, with each page linked to its neighbors. Each browse link 92 accordingly may be implemented as a pair of links, one on each neighboring page, so that each page links to the other. Although not shown in FIG. 5, first page 82A may link to last page 82N, and vice versa, creating a circular structure. The above structure can be effective for web sites that include content with sequential relationships. A web site that implements an alphabetical reference, for example, might link its pages in an alphabetical sequence.

Page navigator 86 may express or display a browse sequence of web pages 82A-82N via page buttons linked to neighboring pages. For example, page navigator 86 may include a page button linked to the previous page. If the current page is page 4, for example, then clicking the previous-page button may change the current page to page 3, in effect decrementing the current page number. The anchor for a previous-page button may include a text link (such as "previous," "PREV," or "back"); an icon or graphic (such as "<"); and/or another indication of the next-lower page. Page navigator 86 similarly may include a button linked to the following page. For example, if the current page is page 10, then clicking the following-page button may change the current page to page 11, in effect incrementing the page number. The anchor for a following-page button may include text (such as "next page," "NEXT," or "more"); an icon or graphic (such as "<"); and/or another indication of the following page.

Set of page buttons 88, numbered or otherwise arranged in series, may express or represent a browse sequence as a result of including links from the current page to its upper and/or lower neighboring pages (that is, to the next and/or previous pages) in a set of statically paginated pages. Although page navigator 86 may contain additional page buttons (such as buttons linked to non-neighboring pages), the presence of buttons linked to the upper and/or lower neighbors establishes a browse sequence equivalent to that of the next-page and previous-page buttons. For example, if the current page is page 3 and page navigator 86 includes a set of buttons that link to pages 1, 2, 3, 4, and 5, then the page 2 button is equivalent to a previous-page button and the page 4 button is equivalent to a next-page button.

Statically paginated web pages may include a set of standing links to important pages within a set or series of pages. For example, page navigator 86 may include a page button linked to the first page of the set of pages. The anchor for this button may include text (such as "page one," "FIRST," or "start"); an icon or graphic (such as "<<"); or another indication that the button is linked to an initial page (such as the start of an article, a table of contents, or the like). Page navigator 86 may have a similar button linked to the last page of a statically paginated set. The anchor for this button may include text (such as "LAST," "end," or "finish"); a graphic (such as ">>"); or another indication that the button is linked to the terminal page (such as the end of the content, a summary, or an index). For example, page navigator 86 may not have room to include a numbered page button for each page of a large set and may show only selected pages, such as a range of pages. Page navigator 86 accordingly may include a first-page button 96 and/or a last-page button 97 to act as a standing shortcut to the beginning and/or end of the article.

Referring now also to FIG. 6, a web page that is part of a statically paginated set may include page navigator 86 that includes page buttons 88 linked to some or all of the pages in the set, and that allows the user to jump to other linked pages. In the example of FIG. 6, web page 82 includes an article 98 that has been divided into a series of five web pages, each with a distinct file name and URL. FIG. 6 happens to show the first of the five pages and includes only an introductory portion of article 98. To expedite access to the rest of article 98, each page of article 98 includes page navigator 86 that links to one or more pages of article 98, such as via set of page buttons 88. Each button 88 may link to another page of article 98 and have an appropriate label, such as a page number or descriptive text displayed as anchor text, a graphical button, or the like. Page navigator 86 includes a set of numbered page buttons 88A-N, one for each page of article 98. Button 88B (labeled 02) links to the second page; button 88C (labeled 03) links to the third page; etc. Especially for articles with many pages, page navigator 86 on a given page may display set of buttons 88 for only a portion of the statically paginated set, such as by showing a specified number of upper and/or lower neighbors.

Page navigator 86 of FIG. 6 also includes a previous-page button 94 and a next-page button 95 so that each page of article 98 links to its lower and upper neighbors, which may be similar to turning pages in a printed book. Each page of article 98 accordingly may have its own version of page navigator 86 that is adjusted to the appropriate relative relationships between pages, and that potentially omits inapplicable relationships (e.g., the last page may have no next page). The page navigator 86 further includes a first-page button 96 and a last-page button 97, which may expedite access to the start and end of article 98.

"Article" may refer to any document, description, discussion, news item, or other unit of content including authored content, generated content, blog entries, bulletin-board threads, "top" lists, image galleries, slideshow features, and so on. A blog system, for example, may be configured to treat the most-recent entry as the first or front page of a statically paginated article and may treat each older entry as a distinct page with a higher page number. A bulletin-board system, for another example, may treat a forum thread as a statically paginated article. As contributors extend the thread, the article may be divided into a series of pages with the most-recent entry at the top of the first page.

In the example of FIG. 4, the file names follow a naming convention that highlights the serial relationship among the web pages. For example, Page 82A, the first page, has the file name "page_1.htm," and each subsequent page increments the digit in the file name. Naming conventions may simplify authoring, and authoring tools and publishing systems may automatically apply naming conventions. It is the systematic linking relationships, and not necessarily the self-documenting file names, that establish the browse sequence. The relationships between the web pages may be logical or conceptual, independent from the file names, and expressed by associations, such as the physical arrangement of the buttons within page navigator 86 and/or the text or graphic anchor of each button.

Techniques for creating web pages include directly writing code with a text editor, indirectly writing code with an authoring tool, and/or generating code with a content management system (CMS) or with related tools, such as bulletin boards, forums, blog systems, wikis, or the like. Any of these techniques may be used to produce web site content with static pagination. For example, an author using a CMS may define articles as containers for content, where each article may be a news item, a discussion of a subject, a blog entry, or the like. The CMS may store the articles and other data in a database, generate web pages to display each article, and provide options to divide articles into multiple pages (e.g., by setting a maximum length for generated pages). For a multi-page article, the CMS may automatically order the pages in series and provide page-based navigational features to link the pages together. Although a CMS may automate the process of creating statically paginated web pages, it is possible to write identical or equivalent code without relying on a CMS. For a hand-coded site, for example, the author may implement sequential pagination as part of the site design, e.g., by observing a convenient file naming convention and coding navigational features that expose the pagination.

A publishing system may limit each generated web page to a specified length. An article that is too long to fit on one web page may be divided into a series of two or more pages. A publishing system may apply static pagination separately to each article. For example, the end of each page may display a link to the next page, with a text or graphic anchor (such as "MORE"). Blog, bulletin board, and similar software may similarly control page size so that long blog entries, forum discussions, or the like flow to multiple web pages. These sequential pages may be statically paginated to, for example, simplify navigation in a long discussion on a forum.

Figure 7:
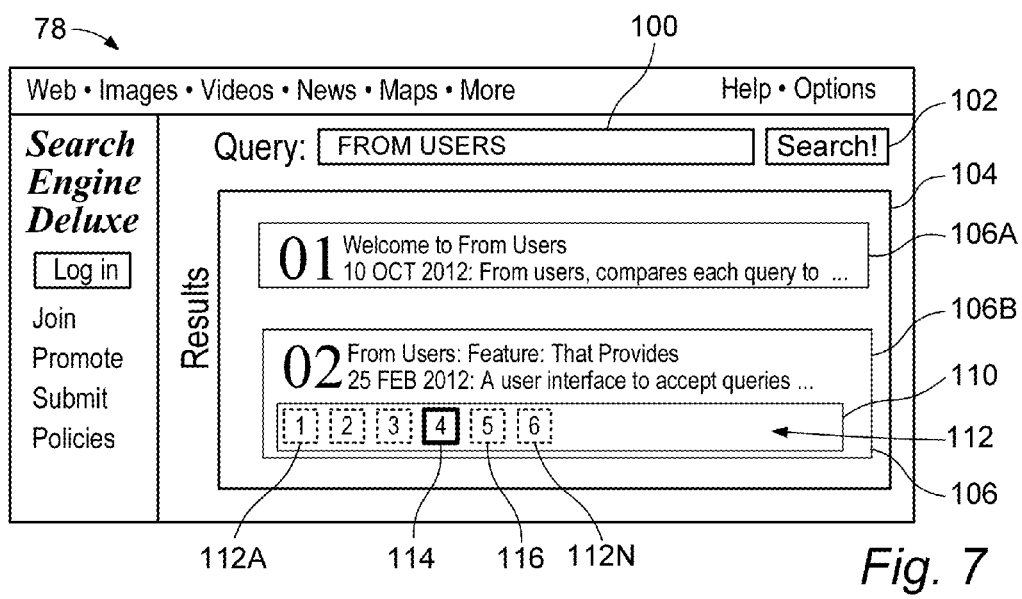
FIG. 7 is a block diagram of an example of a search-engine results page (SERP) that includes a results list and a page block in accordance with the principles of the present inventions.

Referring now also to FIG. 7, SERP 78 may refer to a statically paginated article via a result item 106 that includes a page block 110. Page block 110 may include a plurality of page indicators 112. Each page indicator 112 may be a page-button-like device that may link to a corresponding indexed web page or refresh the SERP (e.g., to show a different range or set of page indicators 112). Indicator 112 may display a label or anchor suitable for the associated page. Labels or anchors may display page numbers or indicate previous, next, first, last, or omitted pages. Each indicator 112 may take the form of a hit indicator 114 (to indicate a page that matched the query) or a miss indicator 116 (to indicate a page that did not match). The arrangement, sequence, and/or text or graphic anchors of indicators 112 may reflect the browse sequence of the indexed article. Page block 110 accordingly may in effect encapsulate references to a multi-page article into a single result item 106, provide page-based access to the indexed article, and indicate one or more pages within article 98 that match query 76 that generated SERP 78.

For example, in the representative SERP of FIG. 7, result item 106B refers to an article that includes a series of six web pages linked together via static pagination. Item 106B includes page block 110 that includes six page indicators 112, one for each page of the indexed article, arranged in series according to the browse sequence of the indexed article. Clicking an indicator 112 opens the associated page. The sequence and labels (anchors) of indicators 112 reflect the browse sequence of the series of web pages. For example, the first indicator is linked to the first page of the article and labeled "1," the second indicator is linked to the second page of the article and labeled "2," and so on. Each label (anchor) may be implemented as, for example, a text string or a graphic button linked to the indicated web page. In the example, query 76 matched the fourth page of the article, and the other five pages did not match. Indicator 112 for the fourth page accordingly takes the form of a hit indicator 114 (distinguished by, e.g., a darker, solid outline), and the other indicators 112 are miss indicators 116 (distinguished by, e.g., a lighter, dashed outline). Result item 106B therefore links to the series of web pages in the article and shows how the search results for the article map to the associated, statically paginated web pages in the article. In FIG. 7, the box drawn around set of indicators 112 is only a representative graphic-design technique for showing an association (or browse sequence for the series of web pages) of indicators 112. Many other techniques for showing grouping may be used including color, size, proximity, sequence, etc.

Page block 110 of SERP 78 may resemble page navigator 86 of web page 82. For example, page indicators 112 in page block 110 for an indexed article may resemble page buttons 88 in page navigator 86 for that article. Page block 110, unlike page navigator 86, is a portion of SERP result item 106, generated by search engine 62 from data collected about the indexed article from the web pages that carry the article and/or from other sources. For example, search engine 62, when generating page block 110, may include data, features, or functions derived from the indexed web page (including its page navigator); from other web pages on the same site or elsewhere; and/or from other sources, such as the search engine itself. For example, page block 110 may summarize the page-match result obtained from index 74.

The search engine 62 may sometimes format page block 110 to look and/or act similar to a page navigator 86 found on the associated indexed web page so that, for example, the user can easily see the correspondence between the SERP result and the indexed page. From a user's intuitive perspective, page block 110 in a SERP may strongly resemble corresponding page navigator 86, as if page navigator 86 were moved from the indexed page to the SERP. In implementation, page navigator 86 is a feature of the indexed page, and corresponding page block 110 is a feature generated by the search engine as a portion of a SERP. The page block may derive from the associated page navigator, however, and may resemble the page navigator.

Because the search engine independently generates page block 110 by, for example, analyzing, interpreting, and representing data extracted from the indexed web site, page block 110 may differ in appearance and/or function from any page navigators found on the indexed web pages. The labels on page buttons 88 on the web page may show simple alphabetical pagination, for example, while the corresponding labels on the page indicators 112 on the SERP may instead show numerical pagination in a "page X of Y" format. Many other differences are possible to adapt the page block to its use on a SERP.

Page indicator 112 may take the form of hit indicator 114 (or the search engine selected the page as a match to the query) or miss indicator 116 (or the search engine did not select the page as a match to the query). In an embodiment, a difference in line type may distinguish hit indicators 114 from miss indicators 116. In FIG. 7, for example, a dashed outline indicates a miss, and a solid outline indicates a hit. Alternative or additional embodiments for distinguishing hit from miss may include the use of different colors, shades of grey, and/or degrees of transparency; the presence, absence, or rate of pulsation; the presence, absence, or appearance of a glowing effect; arrows or other symbols that call attention to the page indicators of matching pages; and/or other graphical and/or audible effects, alone or in combination. For some indexed articles, page block 110 may include a page indicator 112 for each page of the article. In the example of FIG. 7, the indexed article has six pages, and page block 110 has enough room for six numbered page indicators 112. For other indexed articles, it may be practical or preferable to omit page indicators 112 for some pages. For a long article spanning many pages, for example, page block 110 may not have enough room to include page indicator 112 for each page.

Figure 8:
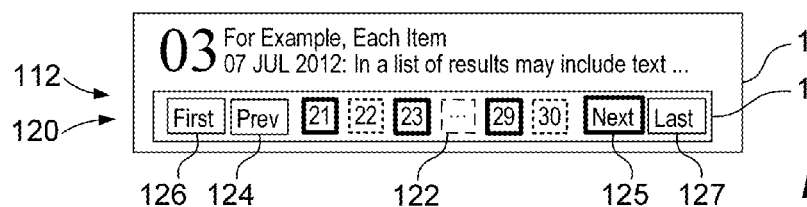
FIG. 8 is a block diagram of an example of a page block having page indicators for a page range and having first-, last-, next-, and previous-page indicators in accordance with the principles of the present inventions.

Referring now also to FIG. 8, page block 110 may include a set of page indicators that show a range or subset of pages, indicated generally at 120, from the indexed article. The search engine may select the range or subset to be displayed by identifying the single best match and including a specified number of pages above and below that of the best match; by attempting to display multiple matches plus (if possible) bracketing pages; and/or by other space-fitting techniques. In the example of FIG. 8, the indexed article has 30 pages, with matches on at least pages 21, 23, and 29. Illustrative page block 110 in FIG. 8 shows a range of pages (pages 21 through 30) selected to include the matching pages, in this instance by omitting pages 1 through 20 and 24 through 28.

Query 76 may return a sparse result when matched to an article. In an embodiment, page block 110 may omit page indicators 112 for pages before, inside, and/or after a displayed range 120 and may indicate the omission by a design element (such as by an ellipsis character). In an embodiment, page block 110 may indicate an omission by an omitted-page indicator 122, which is a type of page indicator that represents one or more page indicators 112 excluded from range 120. For omitted-page indicator 122, the anchor may be a suitable word, phrase, symbol, icon, or graphic (such as an ellipsis character) and the hypertext reference may link to an appropriate web page (such as an omitted matching page or a page in the middle of an omitted range). In an embodiment, the hypertext reference for omitted-page indicator 122 may in effect cause search engine 62 to refresh (or generate and transmit) an updated SERP 78 that includes page indicators 112 for all or part of the omitted range of pages (e.g., a new SERP centered on the omitted range). Refreshing a SERP may include updating descriptive text (e.g., page title and snippet) as well as the page block (e.g., page indicators and associated hypertext references).

For example, for an article that contains one hundred pages, query 76 may match only three pages. Discontiguous matched pages may make it difficult to generate page block 110 that includes page range 120 that spans all of the matched pages. It may be practical or preferable to instead generate page range 120 with one or more omissions in order to include a larger number of matched pages. In the example of FIG. 8, pages 24 through 28 are non-matching so the page block omits pages 24 through 28 to avoid omitting matching page 29. In the example, the anchor is an ellipsis character and the hypertext reference may be a reference to page 26 (the center of the omitted range). Clicking this omitted-page indicator 122 accordingly may in effect request a refreshed SERP 78 that includes page indicator 112 for page 26.

In an embodiment, page block 120 may include page indicators 112 mainly or only for matching pages, which may maximize the number of displayed matches (hits) by eliminating many, most, or all non-matches (misses). With reference to FIG. 8, in an embodiment, page indicator 112 may take the form of a previous-page indicator 124, such as one with an appropriate hypertext reference (link) and an appropriate anchor (label) (e.g., "<", "−", "PREV", or "BACK"). In an embodiment, the hypertext reference of previous-page indicator 124 may directly open the indexed web page immediately "below" the lowest-numbered page referenced in current page block 110. For example, if the first displayed page indicator 112 in page block 110 refers to the second page of an article, previous-page indicator 124 may simply open the first page of the indexed article. In an embodiment, previous-page indicator 124 may refresh the SERP after decrementing the lowest-numbered page referenced in the current page block. For example, if the current page block displays pages 43 through 53, then clicking the previous-page indicator 124 may refresh the SERP to include page indicators for pages 42 through 52.

Page indicator 112 may take the form of a next-page indicator 125, such as one with an appropriate link and label (e.g., ">", "+", or "NEXT") Next-page indicator 125 may be generally similar to previous-page indicator 124, except that next-page indicator 125 increments the pagination displayed in page block 110 instead of decrementing it. In an embodiment, next-page indicator 125 may directly open the indexed web page immediately "above" the highest-numbered page referenced in the current page block. In an embodiment, a next-page indicator may in effect refresh the SERP after incrementing the highest-numbered page referenced in the current page block.

In an embodiment, previous-page indicator 124 and/or last-page indicator 125 may function as hit indicator 114 or miss indicator 116. For example, if page block 110 displays range 120 of page indicators 112 selected to display certain matches to a query, but further matches exist below the displayed range, then previous-page indicator 124 may function as hit indicator 114. As shown in FIG. 8, for example, next indicator 125 uses line type (a dark outline) to indicate that further hits exist beyond displayed range 120. In an embodiment, a previous-page indicator (or next-page indicator) that functions as a hit indicator may refresh page block 110 to include the previous (or next) hit, rather than refresh the page block to include the decremented (or incremented) page number. In an embodiment, a page block may provide distinct "previous page" and "previous hit" indicators and/or distinct "next page" and "next hit" indicators, such as to allow the user to navigate within the SERP either by pages in the article or by matches in the index applied to the article.

In an embodiment, page indicator 112 may take the form of a first-page indicator 126, such as one with an appropriate link (hypertext reference) and an appropriate label (anchor) (e.g., "<<", "1ST", or "FIRST"). In an embodiment, the link for first-page indicator 126 may open the associated indexed web page, such as the first page in the static pagination for the indexed article. In an embodiment, the link for first-page indicator 126 may refresh the SERP to show the SERP in context of the first page of the indexed article. For example, if the current SERP includes a page block that shows a range of pages in the middle of an article, omitting the first page, then the link for first-page indicator 126 may refresh the SERP (or just the result item) show a page block that includes a page indicator that refers to the first page of the indexed article. Whether the link exits or refreshes the SERP may depend on context (the query, article, user history, etc.).

Page indicator 112 may take the form of a last-page indicator 127, such as one with an appropriate link and label (e.g., ">>" or "LAST"). Last-page indicator 127 may be generally similar to the first-page indicator, except that it is directed at the end of an article rather than the beginning of an article. In an embodiment, last-page indicator may link to the last page of the indexed article and/or may refresh the SERP to include a page indicator that refers to last page of the indexed article.

Figure 9:
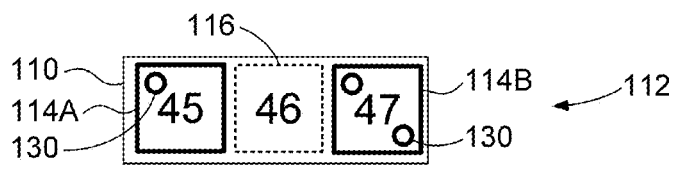
FIG. 9 is a block diagram of an example of a page block that provides keyword indicators for each page indicator in accordance with the principles of the present inventions.

With reference now also to FIG. 9, query 76 may contain multiple keywords, a term that herein includes key phrases. When search engine 62 matches a query to a web page, each keyword may contribute to the match. For example, if a query specifies or implies the logical OR of two or more keywords, then the presence of any keyword may be sufficient to trigger a match. For each match, it may be helpful to show the user which of the keywords matched. In an embodiment, page indicator 112 may distinguish between keywords in a query via a keyword indicator 130, which may be text, graphic, audible, pop-up, and/or other indication of a matching or non-matching keyword. For example, keyword indicator 130, also referred to as a search term indicator, may be a dot, circle, dog-ear symbol, or other mark inside or outside page indicator 112 and arranged in a sequence by keyword. Keyword indicators may include a means of displaying the associated keyword.

In the example of FIG. 9, each keyword in query 76 is associated with a corner of each page indicator 112. The first keyword in the query maps to the top-left corner; the second to the top-right corner; and so on, continuing clockwise. In the example, the indication means is a circle that is present to indicate "hit" and absent to indicate "miss." The user may thus review the page-specific hits by keyword at a glance. Page indicators 112 may include hit indicators 114A and 114B. Indicator 114A includes keyword indicator 130 in the top-left corner, representing a match to the first keyword in the query. Indicator 114B includes keyword indicators 130 in the top-left and bottom-right corners, representing a match to the first and third keywords. In this example based on quadrants, the fifth and subsequent keywords may be ignored or differently represented.

In an embodiment, keyword indicator 130 may display the number of occurrences of the associated keyword on the associated page. A keyword indicator may display a page-match or page-rank value calculated for that keyword and page. Alternative or additional embodiments of keyword indicator 130 may represent keyword-specific match results as bar graphs, text, and/or numerical values, etc. The display mechanism for keyword indicators may include pop-up windows triggered by an event, such as a shift-click or mouse-over. For example, keyword indicator 130 implemented as a pop-up window triggered by hovering over page indicator 112 may enable a page-specific, formatted display of detailed search-engine data associated with a long or complex query.

The algorithms that determine whether a web page is a hit or a miss with respect to a particular query or keyword do not necessarily return an absolute or binary hit/miss result. An algorithm may instead evaluate each page to calculate a score or other measure of the strength of the match. A higher score may indicate a closer match, for example, and a lower score may indicate a more distant match, (e.g., a page scored 73 would have a stronger correlation to the query than one scored 17). In a conventional SERP, the match considered best may be the one at the top of the result list, with weaker matches progressively deeper in the list. Because page block 110 may encapsulate multiple web pages (such as all of the pages in a given article), it may be desirable to indicate stronger or weaker matches within the page block. In an embodiment, page indicators 112 may disclose or reflect the score value associated with each indexed page instead of (or in addition to) providing generalized hit/miss indication. For example, in an embodiment, the size of page indicator 112 may indicate the strength of the match. A larger size may indicate a stronger match, for example, and a smaller size may indicate a weaker match.

Figure 10:
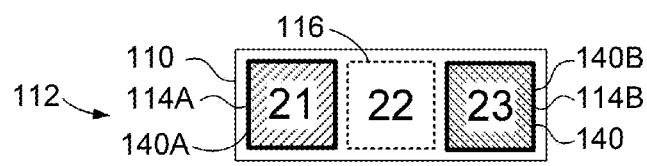
FIG. 10 is a block diagram of another example of a page block that uses differences in shading applied to page indicators to indicate differences in the strength of a match in accordance with the principles of the present inventions.

Referring now also to FIG. 10, alternative or additional embodiments may represent the strength of a match by color coding (e.g., red for "hot" hits), grayscale range (e.g., darker is stronger), numeric score values, pie-chart graphics, bar-graph indicators, sorting the page indicators in score order instead of page order (e.g., best match at the left edge), etc. FIG. 10 depicts an example that uses shading to indicate the strength of a match. Page indicators 112 include hit indicators 114A and 114B and miss indicator 116. In the example, the model is "a darker shade means a stronger hit." Hit indicator 114B includes a strength indication 140B with the dark shade to indicate a strong hit; hit indicator 114A includes a strength indication 140A with a medium shade to indicate a weak hit; and miss indicator 116 remains unshaded to show a non-hit.

Figure 11:
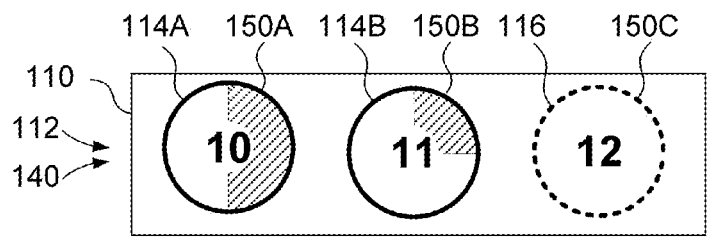
FIG. 11 is a block diagram of a further example of a page block that uses a pie-chart device applied to page indicators to indicate page-to-page differences in the strength of a match in accordance with the principles of the present inventions.

Referring now also to FIG. 11, strength indication 140 may take the form of a pie chart. For example, page indicators 112 have a circular perimeter, where the shaded area inside the circle reflects the strength of the match for the associated indexed page. Hit indicator 114A, for example, includes pie-chart strength indication 150A for a page with a moderately strong match (a medium score), represented by shading about half of the circle. Hit indicator 114B, for another example, includes a strength indication 150B for page with a weaker score, represented by shading about one-quarter of the circle. Miss indicator 116, in turn, corresponds to an indexed page that has a zero or near-zero correlation to the query—as shown by an absence of shading at 150C.

Figure 12:
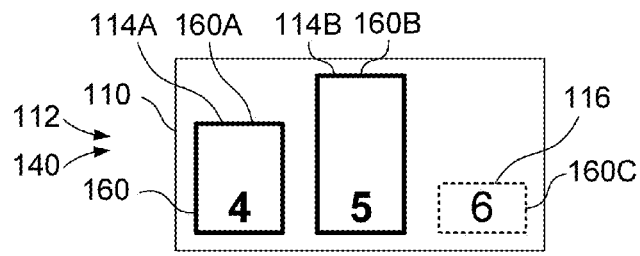
FIG. 12 is a block diagram of another example of a page block that uses differences in the height of page indicators to form a bar chart to indicate page-to-page difference in the strength of a match in accordance with the principles of the present inventions.

Referring now also to FIG. 12, strength indication 140 may take the form of a bar graph. The height of each page indicator 112 may, for example, reflect the strength of the associated match. A tall indicator may represent a strong match, for example, and a short indicator may represent a weak match (e.g., so that a user can scan the profile of the indicators 112 to see a page-to-page variation in the correlation of the article to the query). In FIG. 12, hit indicator 114A, with a medium height, shows a moderately strong match; hit indicator 114B, with a taller height, shows a stronger match; and miss indicator 116, with a short height, shows a weaker match or a non-match.

Figure 13:
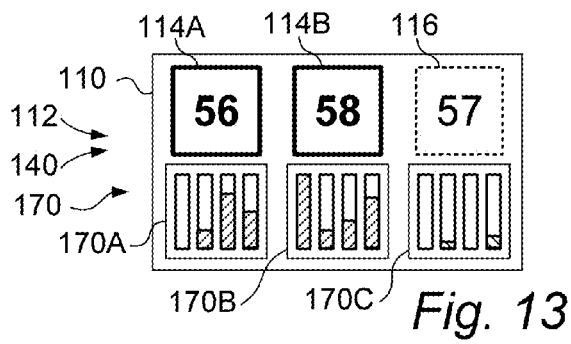
FIG. 13 is a block diagram of a further example of a page block that includes a keyword-specific bar chart associated with each page indicator in accordance with the principles of the present inventions.

Referring now also to FIG. 13, strength indication 140 may include an associated bar chart to indicate, for example, keyword-specific match data for each indexed page. Each page indicator 112 may include an associated bar graph 170 to detail match data, such as a match-strength value separately calculated for each keyword. For example, hit indicator 114A has an associated bar graph 170A that contains a data bar for each of four keywords, where the height of each bar shows the strength of the match for the associated keyword. For indicator 114A, the first keyword is a non-match; the second is a weak match; the third is a strong match; and the fourth is a medium match. Hit indicator 114B shows different bar-graph values for the four keywords, and miss indicator 116 shows weak matches that fall below a threshold for considering the page to be a hit.

In an embodiment, page indicator 112 may provide a feature that displays a preview of the associated indexed web page to the user. The preview may be, for example, a thumbnail image or a text summary. The preview display may include a trigger event and a display mechanism. The trigger event, which functions as a request the view the preview for the indexed page associated with page indicator 112, may be a shift-click, a mouse-over event (such as a hover), or other detectable event or action associated with a page indicator. The trigger event may be referred to as a "selection." The display mechanism may be a pop-up window, a rollover image, a refreshed version of the SERP that includes the preview, or other presentation of preview image or text.

Figure 14:
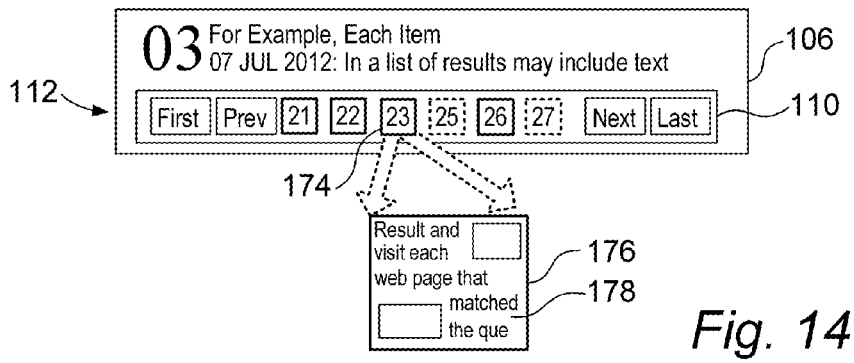
FIG. 14 is a block diagram of another example of a page block that includes a page indicator that displays a thumbnail image of the corresponding indexed page in accordance with the principles of the present inventions.

Referring now also to FIG. 14, hovering the mouse over a particular page indicator 174 acts as a trigger event and yields a pop-up window 176 that contains a preview image 178 of all or part of the associated web page, such as to allow the user to evaluate the page without opening the page itself and/or exiting the SERP. The search engine may generate a preview image of the page beforehand (e.g., by preparing and storing a thumbnail image of the page when crawling the web to place the page in the index) or on request, substantially in real time (e.g., by accessing the page itself or by stored data, such as a cached version of the page). The detection of the trigger event, the opening of pop-up window 176, and the display of preview image 178 may include the use of one or more scripts, such as to push thumbnail image 178 from search server 68 to client device 66 and web browser 65.

In an embodiment, preview image 178 may include query-related features, such as highlighting applied to keywords present in query 76 and in preview image 178. A trigger event may yield a display mechanism that contains data in addition to or other than a preview image. For example, a mouse-over or hover may open a pop-up window that contains data obtained from a database, the search-engine index, and/or other sources.

In an embodiment, page indicator 112 may provide a mechanism for displaying page comments associated with an indexed web page. Comments may include remarks, ratings, rankings, recommendations, feedback, and/or other content contributed to a web page, such as by registered users of a web site via interactive features provided to encourage participation by a community of users. Comments may include text, hypertext, and/or images; user indicia (such as signature text and avatar images); and generated content (such as indications of poll results or page popularity). The search engine may collect and store comment data, such as part of the process of indexing pages. The display of page comments within a SERP result may include a trigger event (or selection) and a display mechanism. The trigger event, which functions as a request to see the comments for the indexed page associated with a selected page indicator 112, may be a shift-click, a mouse-over event (such as a hover), or other detectable event or action associated with the page indicator. The trigger event for the display of comments may differ from that for the display of a preview (e.g., shift-click for one and alt-click for the other). A display mechanism may be a pop-up window, a rollover image, a refreshed version of the SERP that includes the page comments, or other presentation of the comments. Accessing page comments from the SERP may allow the user to review page recommendations, e.g., as an integral part of evaluating search results.

Figure 15:
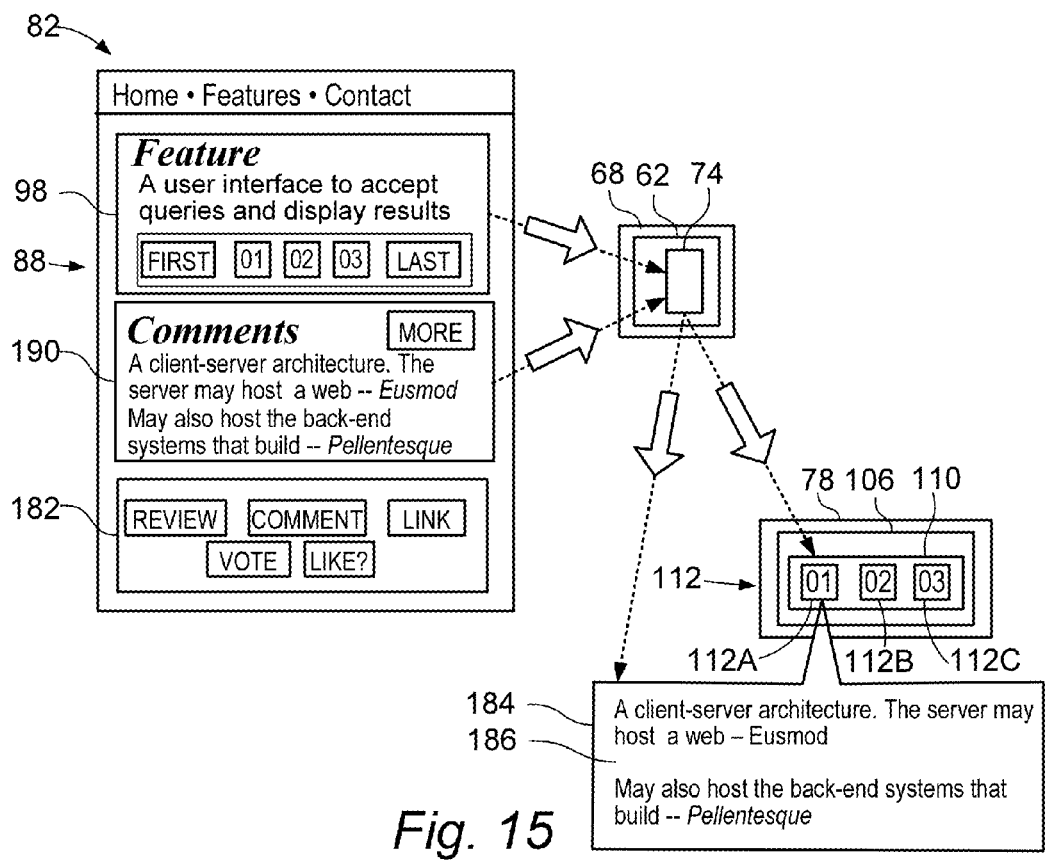
FIG. 15 is a block diagram of a further example of a page block that includes a page indicator that displays annotations, comments, or the like associated with the corresponding indexed page in accordance with the principles of the present inventions.

Referring now also to FIG. 15, web page 82 may display page comments 180 and provide mechanisms 182 for contributing comments 180. When indexing web page 82, search engine 68 may index all or part of article 98 and index and/or store comments 180. When generating SERP 78, the indexed article and/or comments may contribute to the paging ranking process that places the page in SERP result list 104 generated for a given query. Page block 110 in result item 106 associated with web page 82 may include set of page indicators 112 corresponding to page buttons 88 of the indexed article. In the example of FIG. 15, the trigger event is a mouse-over, in this case hovering the mouse over page indicator 112A. Detecting the mouse-over (e.g., via a client-side script) triggers the display mechanism, in this case pop-up window 184 containing comments 186.

In an embodiment, the SERP may contain the comment text as hidden content present in the original SERP code, and the display mechanism may change the comment text from hidden to visible via CSS, script, or other means. In an embodiment, the search engine may, in response to the trigger event, dynamically push comment text stored on the search server to web browser for display via the display mechanism. In an embodiment, page block 110 in a SERP may provide a mechanism for indicating recommendations provided by the search engine to the user, such as by referring to data associated with the user, identifying one or more pages in the page block that correlate to the user data, and drawing attention to pages in the page block based on the correlation.

A search engine may collect data about it users. For example, a search engine may allow each user to establish an account via its web site and encourage each user to disclose demographic data, preference data, and other information. For example, a search engine web site may endeavor to establish a tracking mechanism, such as cookie file on each user's computer to collect ongoing data about the user's search habits. Additionally, a search engine may endeavor to embed a tracking (analytics) script on one or more web sites and use the script to observe user behavior within a site and/or between multiple sites. Different sources of user data potentially may be cross-correlated.

A user's data may be used to predict the user's interests. In an embodiment, a user's data may be cross-referenced to SERP result item 106 that includes page block 110 and further cross-referenced to each page indicator 112 in the page block. The cross-reference operation may identify one or more pages in the statically paginated set that correlate to the user data. This correlation may predict the user's interest in those pages. The search engine accordingly may recommend correlated pages within the page block to the user by, for example, applying a distinctive indication to page indicators 112 associated with recommended pages. This recommendation represents a match based on the user data (e.g., user history) instead of, in addition to, or in combination with a match based on the query (e.g., keywords).

Figure 16:
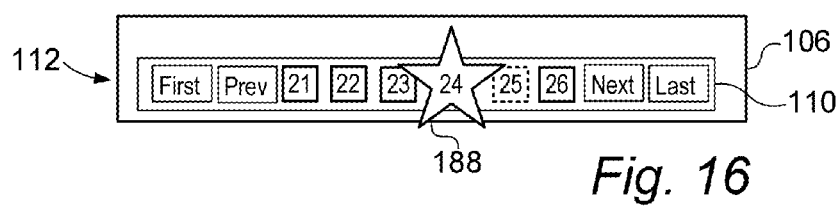
FIG. 16 is a block diagram of another example of a page block in which recommended pages are labeled in accordance with the principles of the present inventions.

Referring now also to FIG. 16, the recommendation may take the form of a recommendation indicator applied to or associated with the recommended pages in the page block. For example, the search engine may generate page indicators with an associated "recommended" shape, symbol, icon, label, or other device that identifies the recommended pages. In the example of FIG. 16, a recommended-page indicator 118 consists of a star-shaped page indicator, calling attention to the recommendation of page 24 in page block 110.

Recommendations may occur by other criteria. For example, a user may be a member of a membership site, such as a social media site. The search engine may associate that membership with that user via a record in the user's user data (such as after the user or site discloses the membership), or after the search engine discovers the membership (such as during the indexing process). The membership site may in turn associate members in groups, such as groups of friends or colleagues. In an embodiment, a search engine may identify a search performed by a user, cross-reference the search to the user's user data including memberships, cross-reference the memberships to (for example) data, such as lists of friends and colleagues, and recommend pages based on the derived data (e.g., pages that mention friends or colleagues).

To build an index, a search engine may visit at least one web page, obtain and analyze the content and/or code of each page, construct a searchable index that includes references to the visited pages, occasionally update the index, etc. For some or all of these tasks, the search engine may employ a hardware/software system called a "spider," which may autonomously follow links to find web pages and other resources. After finding a page, the search engine may analyze and index it. This processing may include parsing the page code (including included files if appropriate) to identify hyperlinks (e.g., by scanning the HTML, scripts, and/or other associated code for tags and/or instructions that encode links). For example, HTML tags that encode links may follow this syntax: <a href="URL">LINK</a> where URL represents the hypertext reference (the web page or other resource opened by the link) and LINK represents the anchor (the visible text or image that, when clicked, activates the link). A basic syntax for the URL portion of a link is: scheme:// server.domain/resource where "scheme://" is a protocol, such as "http" or "https", "server" is a machine name, such as "www"; "domain" is an IP address or a name that resolves to an IP address, such as "foo.com"; and "resource" (if present) is the path name of a resource, such as that of a particular HTML file, e.g., "page_1.htm". Combining the examples yields this URL: http://www.foo.com/page_1.html. A generalized HTML and URL syntax may contain other elements.

While parsing a page for links, the search engine may build and store a list of links found on that page. For each listed link, the search engine may store link data, such as the URL and LINK portions of the code. The result is a list of zero or more links present on the page. The search engine may analyze the list, such as to identify visited and unvisited pages and to find relationships between pages.

The process of recognizing a set of statically paginated pages, such as to identify the browse sequence of those pages, may begin when the search engine visits a first page, parses the page, and builds list of links contained in the page. The search engine then selects a second page from the first-page list of links, visits and parses the second page, and builds a list of links for the second page. The search engine may analyze the second-page list to detect the presence or absence of at least one link to the first page. If present, the first page links to the second, and the second to the first. This pair of interlinked pages may be include a minimal browse sequence and a candidate for being displayed, in a SERP that refers to either of the indexed pages, via page block 110 with page indicators 112.

On completing and analyzing the second-page list of links, the search engine may return to the first-page list, select a third page if present, build a list of links for the third page, and analyze the third-page list for links to the first page and/or second page. If present, these links indicate that the third page may be a member of the browse sequence. The process continues for subsequent pages until the search engine has analyzed all of the first-page links and unvisited second-, third-, and subsequent-page links. An option to simplify the processing is to limit the search to links within the same domain name as the first page, implementing the assumption that pages in the same browse sequence are usually hosted on one web site.

The general goal in identifying a browse sequence is to detect pairs of interlinked pages that form a chain of interlinked pages. For example, the goal is to detect a first page linked to a second page, the second page being linked to the first page and to a third page, the third page being linked to the second page and to a fourth page, etc. The inner members of the series may be interlinked with both upper and lower neighbors, forming a chain. The initial page may omit the link to its absent lower neighbor, and the final page may omit the link to its absent upper neighbor (a linear browse sequence). Alternatively, the initial and final pages may form an interlinked pair (a circular browse sequence).

Figure 17:
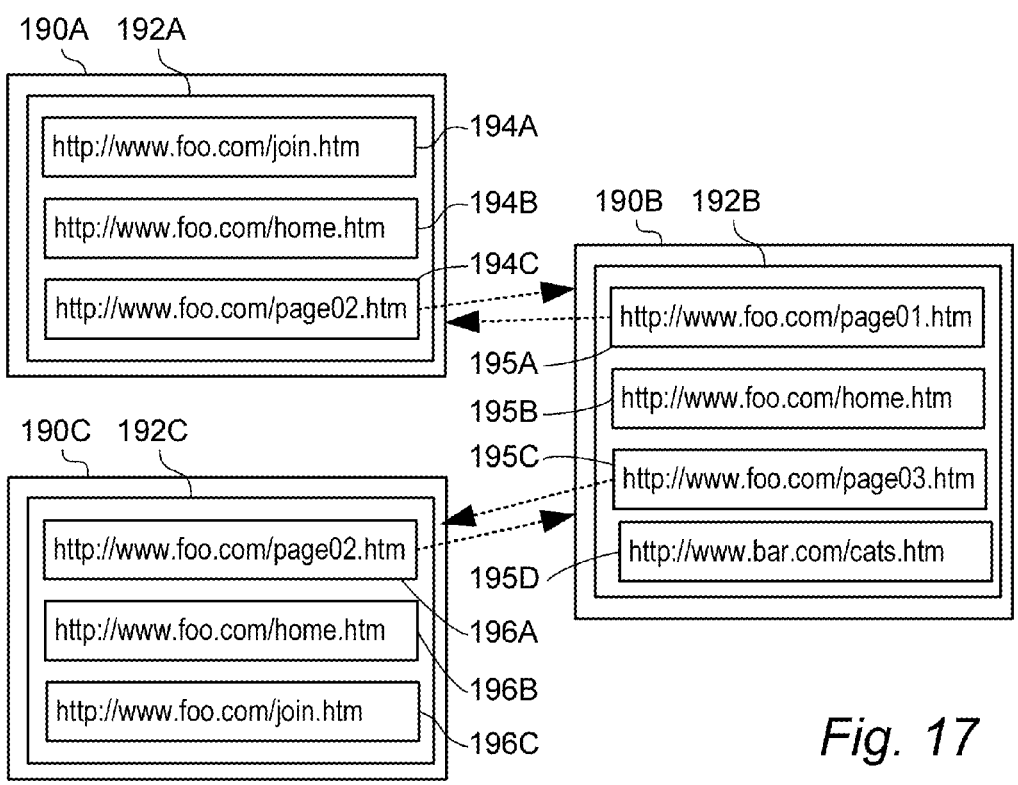
FIG. 17 shows an example of a method of identifying a browse sequence in the code of a web page in accordance with the principles of the present inventions.

Referring now also to FIG. 17, analysis of a first page 190A yields a list of links 192A containing links 194A-C; analysis of a second page 190B yields list 192B containing links 195A-D, and analysis of a third page 190C yields a list of links 192C containing links 196A-C. Analysis of first-page list 192A shows that link 194C refers to second page 190B, and analysis of second-page list 192B shows a link to first page 190A, indicating that pages 190A and 192 are interlinked. Analysis of second-page list 192B also shows a link 195C to third page 190C, and analysis of third-page list 192C shows a link 196A to second page 190B, indicating that pages 190B and 190C are interlinked. Overall, the analysis detects a chain of interlinked pages, 190A to/from 190B to/from 190C. The analysis therefore detects a browse sequence for the statically paginated web pages.

The goal of identifying relationships of statically paginated web pages may simplify the analysis task, such as by allowing the analysis to consider only URLs with the http or https protocol and only URLs that represent web pages and by excluding other file types that may be encountered on the web. Detecting semantic file names (such as page1.html, page2.html, and page3.html) may simplify the analysis, especially because many browse sequences are constructed programmatically and follow predictable file naming conventions. Detecting semantic anchor names (such as page numbers, first-page/last-page indications, and/or previous-page/next page indications) may simplify analysis because anchor names may be selected to highlight the browse sequence to the reader. Detecting and analyzing <div> structure may simplify analysis, since many designs place recurring navigation links inside a <div>, which may have a semantically meaningful identifier. Detecting patterns in generated code associated with popular CMS tools may simplify analysis. For example, WordPress blogs may generate browse sequences and page-navigation features in a distinctive way, while Joomla! sites may generate browse sequences and page-navigation features in a different distinctive way. Parsing page code for indications of popular authoring tools may sometimes aid the analysis and improve accuracy, such as by setting limits on the search space.

In an embodiment, files that have native pagination can be parsed to detect the pagination. PDF files, for example, may contain an overt page structure (or static pagination) expressed in the PostScript language. Parsing the PostScript code for page breaks, page numbers, and other page indicia during indexing may allow the search engine to provide page block 110 and page indicators 112 for the PDF file when present in SERP result list 104. Other file types with native pagination, such as word processor, spreadsheet, or presentation software files, may lend themselves to equivalent page-based analysis, indexing, and SERP display.

After detecting a browse sequence for statically paginated web pages (such as for article 98 that spans multiple pages), the search engine may index the article as a paginated unit to expedite generating result item 106 for the article that includes page block 110. The search engine accordingly may maintain a record of the association and sequence of pages in the browse sequence and generate the corresponding page indicators according to the content of the associated pages. In addition to displaying the article as a unit in a page block, a search engine may also index and display the separate pages. That is, the search engine may sometimes generate result item 106 that references only one page of the browse sequence, independent from the rest of the browse sequence.

When a conventional search engine receives a query from a web browser, it may compare the query to the index, select items from the index that (by certain criteria) match the query, construct a SERP, and return the SERP to the requesting browser. When a search engine receives a query, it may perform further processing for result items associated with statically paginated pages. For example, when indexing a statically paginated set of pages, the search engine may keep records of statically paginated sets, the associations among pages in a given set, the browse sequence of those pages, the membership each page in zero or more sets, etc. An index entry for a set or a member of set may include browse sequence data. The browse sequence data may include a flag that marks the entry a reference to a statically paginated set of pages; or the data may include or refer to a description of the statically paginated set (such as a list of the URLs in the set); or the data may include a unique identifier associated with the set (e.g., to look up related data or track access to the set from the SERP). In general, the search engine may collect and maintain records related to statically paginated web pages, such as part of the process of finding and indexing web pages. The search engine, by reference to these records, may distinguish between result items 106 that may contain page block 110 from result items for non-static pages that do not contain page block 110.

On receipt of a query, a search engine may generate a SERP that contains result list 104 that contains zero or more result items 106 related to the query. If result item 106 refers to a statically paginated set or member of the set, then the search engine may generate page block 110 to display the browse sequence of that set and include page block 110 (such as a portion of the associated result item). To generate the page block, the search engine may analyze its records of the statically paginated set. For example, the search engine may determine the number of pages in the set, measure the match between the query and/or keywords and each page, build a page preview, check for user-added comments for the page, check for potential recommendations, etc.

The search engine may select pages in the set for display in the page block. For example, if the number of pages in the set is too large to include page indicator 112 for each page in the page block, then the search engine may select pages to include or exclude. The criterion for selection may depend on the embodiment of the page block. For example, in an embodiment that limits the page block to a range of page indicators, the search engine may select the strongest single match in the set, center it in the page block, and add upper and lower pages to complete the range.

The search engine may generate a page indicator for each page. For example, if the page block displays a range of pages, then the search engine may, for each page in the range, generate a page indicator with a selected anchor and URL. The anchor may be a text anchor, a button generated as an image file, a button expressed in CSS, or otherwise provided. The label of the anchor, whether text or image, may be selected according to the referenced page. For example, if the referenced page is the fourth page of a set, then the label may be the digit "4." Labels for first-page, last-page, next-page, previous-page, and omitted-page indicators may be similarly determined, each according to its function. The URL portion of the page indicator may be selected according to its function in the context of the SERP. For example, hit and miss indicators may include a URL that opens the current version of the page, such as by directing the browser to the hosting site. First-page, last-page, next-page, previous-page, and omitted page indicators may in some cases open referenced file and in other cases refresh the SERP so that the page block includes a different selection of pages. For example, clicking NEXT may refresh the SERP with an incremented page block.

In some embodiments, generating the page indicators may involve generating additional code. In an embodiment that provides a pop-up page preview triggered by a mouse-over event, for example, the page indicators may include or refer to script or other code that implements the feature. Page previews and other images may be preloaded with the SERP or delivered on request.

Styling for the page block and page indicators may be standardized, adapted from the indexed set of pages, or otherwise determined. For example, the size, shape, color, and other attributes of page indicators may reflect those of the page navigator and page buttons of the indexed page. Emulating the indexed page may require parsing its HTML, CSS, or script code or other analysis (e.g., to identify attributes applied to page navigator 86, page buttons 88, etc.) found on the indexed page.

Figure 18:
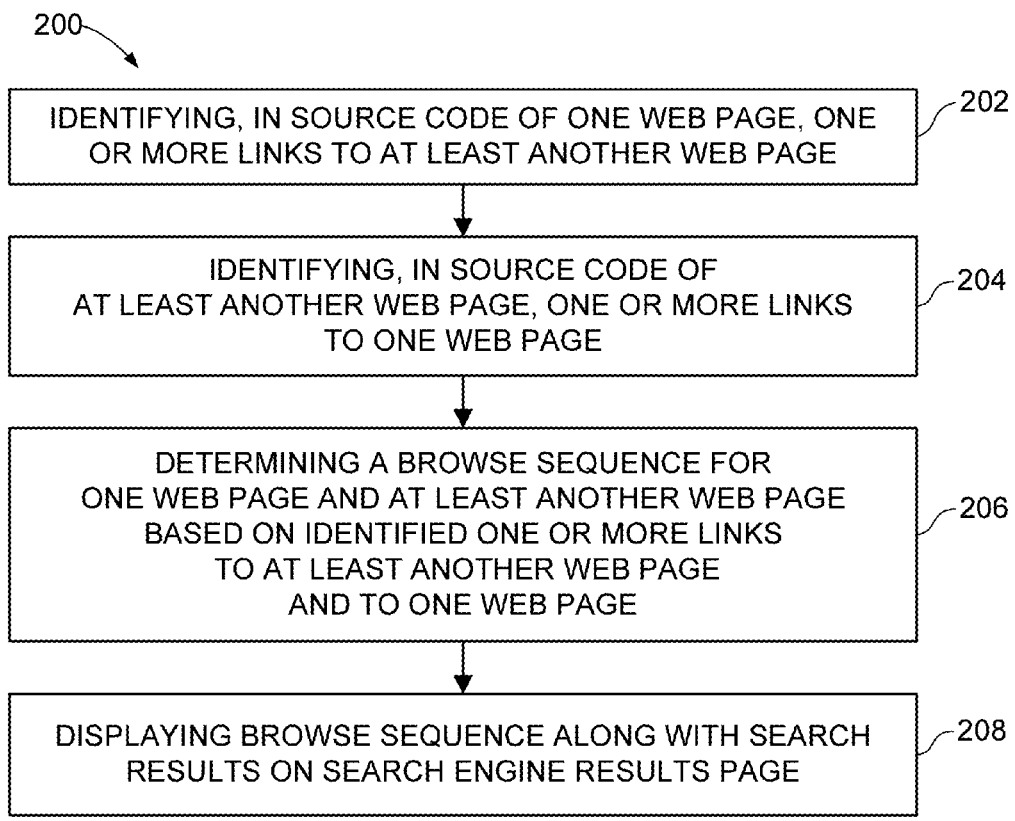
FIG. 18 shows an example of a method of displaying a browse sequence for a plurality of statically paginated web pages on a search engine results page in accordance with the principles of the present inventions.

Referring now also to FIG. 18, a method 200 for displaying a browse sequence for a plurality of statically paginated web pages on a search engine results page may include identifying, in the source code of one web page (or a first page), one or more links to at least another web page (or at least a second page) at 202; identifying, in the source code of the at least another web page, one or more links to the one web page at 204; determining a browse sequence for the one web page and the at least another web page based on the identified one or more links to the at least another web page and to the one web page at 206; and displaying the browse sequence along with search results on a search engine results page (SERP) at 208, the search results including information regarding one or more of the one web page and the at least another web page. Method 200 may include other, alternative, or additional elements; may omit one or more elements; and/or may follow a different sequence of elements from that listed.

Identifying links in the source code of a first web page may include obtaining a copy of the source code of the page (e.g., by visiting the page with a spider, which may be a search engine component that crawls the web to find pages and return page code to a search engine). Identifying the above links may include parsing the obtained code of the first web page (including referenced files) to identify hyperlinks, such as by scanning the HTML and/or associated code (e.g., scripts for tags and/or instructions that encode links). Additionally, identifying the above links may include building a list of links found in the page. For each link, the list may include an anchor, a URL, and/or other data. In an embodiment, the list may include only links to web pages and/or only links in the same domain as the first page.

Identifying, in the source code of a second web page, one or more links to the first web page may include selecting the second page by selecting a link from the list of links constructed above. Identifying the above links may include obtaining a copy of the source code of the second page (e.g., by visiting the page with a spider via the URL obtained from the list). Additionally, identifying the above links may include retaining a record of the first page (e.g., by storing its URL as the referring URL) to aid in identifying links in the second page that refer to the first page. Identifying the above links may include parsing the obtained code for links, building a list of links found in the second page, and comparing the URL for each link in the second-page list with the URL of the first page (i.e., the referring URL). If the URL of the second-page link matches the first-page URL, then the second-page list includes one or more links to the first web page.

Determining a browse sequence for the first page and the second page based on the identified links may include detecting whether the first page and the second page are interlinked web pages. For example, identifying links in the first page may include building a list of links found in the first page and selecting the second page from the list. This selection method assures that the first page is linked to the second page. Identifying links in the second page in turn may include building a list of links found in the second page and analyzing the list for the presence or absence of at least one link to the first page (e.g., by comparing the URL of each link in the list to URL of the first page). If at least one link to the first page is present, then the first page and the second page are an interlinked pair, which determines that the first and second pages are statically paginated and include a browse sequence.

Displaying the browse sequence along with the search results on a SERP may include matching a query to an index, selecting a result from the index, determining if the selected result refers to a set of statically paginated pages, and generating a corresponding result item to include in the SERP result list. Displaying the browse sequence may include selecting and including information, such as a page title and snippet associated with the page from the index or other sources.

For a result item that refers to set of statically paginated pages, displaying the browse sequence may include generating and including a plurality of page indicators, which may sometimes may be referred to as buttons. The sequence of the page indicators, and the anchor and URL of each page indicator, may reflect or represent the browse sequence of the referenced pages. Each page indicator (or button) accordingly may include page indicium (such as a label or an anchor) that refers to the referenced page. The page indicia associated with each page indicator (or button) may include page number indicia. For example, if the browse sequence includes first, second, and third pages, then the corresponding page indicators may be arranged in the same sequence, labeled with the underlying page numbers (which may be digits, letters, names, etc.) and linked to each page in series.

Displaying the browse sequence may additionally include incorporating a link to the associated page in the corresponding page indicator. For example, the page indicator associated with a first page may link to the first page via its URL; the page indicator associated with a second page may link to the second page via its URL; and so on for subsequent page indicators. Displaying the browse sequence may further include determining the type of page indicator to use for each page and generating the appropriate page indicator. For example, the page indicator for a matching page may take the form of a hit indicator, and the page indicator for a non-matching page may take the form of a miss indicator. Displaying the browse sequence may additionally include generating next-page, previous-page, first-page, last-page, and/or omitted-page indicators, each with a suitable anchor and hypertext reference (URL) (e.g., to provide a page block on the SERP comparable to a page navigator on a web page).

In an embodiment, displaying the browse sequence may further include generating a preview of one of the one web page and the at least another web page when a page indicator corresponding to the one of pages is selected from the SERP. Generating a preview may include preparing a thumbnail image, text (such as summary text), or other reduced representation of the indexed page (e.g., as part of the process of obtaining and analyzing page code to place references to the page in an index). Generating a preview may include transmitting a copy of the preview image or text to the browser. The transmission may occur on request or substantially in real time after triggering event (or selection) or when transmitting the SERP, such as a hidden image preloaded in the background by a script in the SERP). The triggering event or selection for a preview may be distinct from the triggering events that open a page or that request display of user comments. For example, clicking the page indicator may open the associated page, while a mouse-over event (such as a hover) may display the preview. Displaying the browse sequence may include invoking a display mechanism, such as a pop up window, rollover image, or refreshed version of the SERP containing the preview image or text. Each page indicator in a page block may have a distinct associated preview.

In an embodiment, displaying the browse sequence may further include receiving comments from one or more users of one or more pages represented by displayed page indicators. Receiving comments may include collecting, storing, and indexing comments entered on a page by its users. For example, a search engine spider may, when returning page code for indexing, collect and return user comments, which may include text and/or images. Receiving comments may include parsing the page code to detect comments, such as by scanning the code for features used to collect and display comments. Receiving comments may include extracting detected comments from the rest of the page, storing and maintaining comment data, and associating the stored data with the commented page, such as to expedite displaying comments from the page indicator for the page.

Displaying the browse sequence may additionally include displaying the received comments, such as when the page indicator corresponding to the commented page is selected from the SERP. Displaying comments may include transmitting a copy of the comment data to the browser. The transmission may occur after a trigger event or while transmitting the SERP, such as hidden text that can become visible text (e.g., by changing its display attribute in CSS). The triggering event (or selection) for comment text may be distinct from the triggering events that open a page or request a preview. For example, clicking a page indicator may open the associated page, while shift-clicking the indicator may instead display the associated comments. Displaying the browse sequence may include invoking a display mechanism, such as a pop-up window, rollover image, or refreshed version of the SERP containing the comments. Each page indicator in a page block may have distinct associated comments.

In an embodiment, displaying the browse sequence may further include displaying at least one search term indicator (or keyword indicator) with one or more page indicators of the plurality of page indicators. Displaying a search term indicator may include calculating and storing a page-match or page-rank value, for at least the displayed page indicators, for each keyword or key phrase in the query associated with the SERP. These separate values may be components of the index-ranking process applied to the page as a whole. Displaying a search term indicator may include displaying the keyword-specific indications for each page in conjunction with the associated page indicator.

Displaying a search term indicator may include representing the keyword-specific page match data as a numeric value, bar graph, and/or symbol, such as circle or dot applied inside or outside the perimeter of the page indicator. The keyword-specific values may be represented as hit or miss values, such as after comparing scores to a threshold value. A dot in the upper-left corner of a page indicator, for example, may indicate that the first keyword in the query matched the page associated with that keyword.

In an embodiment, displaying a search term indicator may include displaying the number of occurrences of an associated keyword. For example, a page indicator may include a pop-up feature that is triggered by an event (such as a shift-click) that displays a table of associated keywords, each with associated counts, scores, and/or statistics. In an embodiment, displaying a search term indicator may include displaying, for each displayed page indicator, an indication of each matching keyword. For example, if a query contains first, second, and third keywords, and a result item includes first and second page indicators, then each of the two page indicators may display or omit a keyword indicator for each of the three keywords. For example, if the first keyword matches both pages, the second keyword matches only the second page, and the third keyword does not match either page, then the first page indicator may include only the first keyword indicator, the second page indicator may include both the first and second keyword indicators, and the third keyword indicator may be absent from both pages.

Method 200 may further include incorporating links to each of the first page and second page in the displayed browse sequence. For example, each page indicator in a page block may include a hypertext reference that encodes a URL directed at the associated web page, thereby incorporating links in the browse sequence displayed in the SERP that correspond to the browse sequence between the first page, second page, and subsequent pages (if any).

The terminology used herein is for the purpose of describing particular embodiments only and is not intended to be limiting of the described inventions. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present inventions has been presented for purposes of illustration and description, but is not intended to be exhaustive or limited to the inventions in the form disclosed. For example, the invention may be embodied in an environment that is not part of a revision control system. Many modifications and variations will be apparent to those of ordinary skill in the art without departing from the scope and spirit of the inventions. The embodiments were chosen and described in order to best explain the principles of the inventions and the practical application, and to enable others of ordinary skill in the art to understand the inventions for various embodiments with various modifications as are suited to the particular use contemplated.

What is claimed is:

1. A computer system, comprising:
   a processor;
   a memory; and
   a program comprising a plurality of instructions stored in the memory that are executed by the processor to:
   identify, in the source code of one web page, one or more links to at least another web page;
   identify, in the source code of the at least another web page, one or more links to the one web page;
   determine a browse sequence for the one web page and the at least another web page based on the identified one or more links to the at least another web page and to the one web page; and
   display a plurality of search results on a search engine results page, wherein a selected one of the plurality of search results includes information regarding one or more of the one web page and the at least another web page, and wherein the displaying further comprises displaying the browse sequence for the one web page and the at least another web page as part of the selected one of the plurality of search results.

2. The computer system of claim 1, wherein the plurality of instructions further comprises instructions that are executed by the processor to display the browse sequence as a plurality of page indicators.

3. The computer system of claim 2, wherein the plurality of instructions further comprises instructions that are executed by the processor to incorporate a link to one of the one web page and the at least another web page in each page indicator of the plurality of page indicators.

4. The computer system of claim 2, wherein the plurality of instructions further comprises instructions that are executed by the processor to generate a preview of one of the one web page and the at least another web page when a page indicator corresponding to the one of the one web page and the at least another web page is selected from the search engine results page.

5. The computer system of claim 2, wherein the plurality of instructions further comprises instructions that are executed by the processor to:
   receive comments from one or more users for one of the one web page and the at least another web page; and display the received comments when a page indicator corresponding to the one of the one web page and the at least another web page is selected from the search engine results page.

6. The computer system of claim 2, wherein the plurality of instructions further comprises instructions that are executed by the processor to display a first search term indicator that represents the number of occurrences of a first search term with each page indicator of a web page that includes the first search term, the first search term being used to generate the search results on the search engine results page.

7. The computer system of claim 6, wherein the plurality of instructions further comprises instructions that are executed by the processor to display a second search term indicator that represents the number of occurrences of a second search term with each page indicator of a web page that includes the second search term, the second search term being used, with the first search term, to generate the search results on the search engine results page.

8. A computer program product for displaying a browse sequence for a plurality of statically paginated web pages on a search engine results page, the computer program product comprising:
    at least one computer readable storage medium having computer readable program instructions embodied therewith, the computer readable program instructions, when read by a processor, being configured to:
    identify, in the source code of one web page, one or more links to at least another web page;
    identify, in the source code of the at least another web page, one or more links to the one web page;
    determine a browse sequence for the one web page and the at least another web page based on the identified one or more links to the at least another web page and to the one web page; and
    display a plurality of search results on a search engine results page, wherein a selected one of the plurality of search results includes information regarding one or more of the one web page and the at least another web page, and wherein the displaying further comprises displaying the browse sequence for the one web page and the at least another web page as part of the selected one of the plurality of search results.

9. The computer program product of claim 8, wherein the computer readable program instructions, when read by a processor, are further configured to display the browse sequence as a plurality of page indicators.

10. The computer program product of claim 9, wherein the computer readable program instructions, when read by a processor, are further configured to incorporate a link to one of the one web page and the at least another web page in each page indicator of the plurality of page indicators.

11. The computer program product of claim 9, wherein the computer readable program instructions, when read by a processor, are further configured to generate a preview of one of the one web page and the at least another web page when a page indicator corresponding to the one of the one web page and the at least another web page is selected from the search engine results page.

12. The computer program product of claim 9, wherein the computer readable program instructions, when read by a processor, are further configured to:
    receive comments from one or more users for one of the one web page and the at least another web page; and
    display the received comments when a page indicator corresponding to the one of the one web page and the at least another web page is selected from the search engine results page.

13. The computer program product of claim 9, wherein the computer readable program instructions, when read by a processor, are further configured to display a first search term indicator that represents the number of occurrences of a first search term with each page indicator of a web page that includes the first search term, the first search term being used to generate the search results on the search engine results page.

14. The computer program product of claim 13, wherein the computer readable program instructions, when read by a processor, are further configured to display a second search term indicator with each page indicator of a webpage that includes a second search term, the first and second search terms being used to generate the search results on the search engine results page.

* * * * *